United States Patent [19]
Plasko

[11] Patent Number: 6,084,501
[45] Date of Patent: *Jul. 4, 2000

[54] THERMAL CUTOFF SWITCH

[75] Inventor: Emil R. Plasko, Stevensville, Mich.

[73] Assignee: Therm-O-Disc Incorporated, Mansfield, Ohio

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/851,013

[22] Filed: May 5, 1997

[51] Int. Cl.$^7$ .......................... H01H 37/46; H01M 2/00; H01M 6/02

[52] U.S. Cl. ........................ 337/382; 337/140; 429/61; 429/62; 429/150

[58] Field of Search ...................... 337/140, 139, 337/333, 379, 381, 382; 60/527, 528; 251/129.02; 148/402, 563; 439/161, 267, 325, 630, 932; 429/61, 62, 66, 57, 58, 54, 7, 122, 174, 150

[56] References Cited

U.S. PATENT DOCUMENTS

| | | | |
|---|---|---|---|
| 4,035,552 | 7/1977 | Epstein | 429/58 |
| 4,855,195 | 8/1989 | Georgopoulos et al. . | |
| 4,973,936 | 11/1990 | Dimpault-Darcy et al. | 338/32 R |
| 4,975,341 | 12/1990 | Tucholski et al. . | |
| 4,992,339 | 2/1991 | Georgopoulos . | |
| 5,188,909 | 2/1993 | Pedicini . | |
| 5,376,467 | 12/1994 | Abe et al. | 429/7 |
| 5,747,187 | 5/1998 | Byon . | |
| 5,766,793 | 6/1998 | Kameishi et al. | 429/62 |
| 5,879,832 | 3/1999 | Vu et al. . | |

FOREIGN PATENT DOCUMENTS

| | | |
|---|---|---|
| 59-191273 | 10/1984 | Japan . |
| 59-203376 | 11/1984 | Japan . |
| 63-175345 | 7/1988 | Japan . |

*Primary Examiner*—Leo P. Picard
*Assistant Examiner*—Anatoly Vortman
*Attorney, Agent, or Firm*—Harness, Dickey & Pierce

[57] ABSTRACT

A self-contained unitary thermal cutoff switch assembly having a hollow sealed switch housing formed by a collector and a lid that serve as the switch contacts. Separating the collector and the lid is a plastic insulating liner that generally follows the inside contour of the collector. The lid is held in place at the open end of the collector by folding over the top lip of the collector which will, at the same time, fold over the insulator in a U-shape about the edge of the lid and hold and insulate the lid in a spaced relationship with the collector. A shape memory collector formed as a straight piece of wire is located between the lid and the side of the collector opposite the lid. The wire is held in alignment by an opening through the insulator which supports an end portion of the wire adjacent to the bottom of the collector. When the thermal cutoff is subjected to a temperature equal to or greater than the recovery temperature of the shape memory conductor, the conductor will change to its recovered shape and open the circuit. If a high resistance circuit through the open thermal cutoff switch is required, the plastic insulator may be molded of a partially conductive compound by using a mixture such as polypropylene and carbon black.

26 Claims, 2 Drawing Sheets

THERMAL CUTOFF SWITCH

BACKGROUND OF THE INVENTION

The invention relates to a thermal cutoff switch and in particular to a thermal cutoff switch that is sealed for use in electrochemical batteries to open the conductive path within the battery if the battery overheats.

There are many applications in the prior art where it is necessary to disconnect electrical circuits when temperatures exceed a predetermined amount. For example only, fire alarms need to be triggered upon a certain temperature being reached at a particular location. Further, in the art of electrochemical cells, it is well known that during charging or discharging of the cell, the amount of internal resistance and the rate of current flow all determine the degree of heat generation within the cell.

If the rate of heat dissipation from an electrochemical cell to the environment is smaller than the rate of heat generation inside the cell, the cell temperature will increase steadily. If the current flow is continuously maintained, a point may be reached where the cell explodes. At this point, some of the cell components such as, for example, lithium and free sulfur resulting from reduction of the components, react instantly with each other and all of the energy of the system is released at once. This is an extremely dangerous condition that may occur if the cell temperature is permitted to exceed the melting point of the elements such as sulfur and lithium.

It becomes important therefor to use an inexpensive, simple thermal cutoff switch in such situations that will open the circuit and interrupt the current flow. In some cases, such as with primary battery cells, it may be important to have a high resistance across the open thermal cutoff switch to bleed down battery power when the thermal cutoff switch opens. Such a battery, when discarded, is thereby rendered more benign.

It is also important to provide an inexpensive simply constructed thermal cutoff switch that may be used to open electrical circuits, or close electrical circuits, upon the attainment of predetermined temperatures. In the battery art, it is important to have the thermal cutoff switch of such a size and construction that it can be located within the battery to sense the internal battery temperature. The switch must also be resistant to the electrolytes that are in the battery, and provide a resistance that is inserted in the circuit when the thermal cutoff switch is opened to bleed down the battery power if the battery becomes short circuited.

SUMMARY OF THE INVENTION

The present invention overcomes the disadvantages of the prior art by providing an inexpensive, simple thermal cutoff switch that can be used to close or open a circuit when a predetermined temperature is reached in the area where the thermal cutoff switch is located. The switch may be formed as a sealed container so as to enable the switch to be used internally of a primary electrochemical cell without being adversely affected by the chemicals therein. The sealed unit has a conductive collector element held in spaced relationship with a conductive lid element.

An electrical insulator located between the collector and the lid supports an elongated shape memory conductor in the space between, and in a direction perpendicular to, the collector and the lid. The shape memory conductor electrically connects the collector and lid such that subjecting the conductor to a temperature equal to or greater than its recovery temperature causes the conductor to assume its recovered shape. This breaks the electrical connection between the collector and the lid non-reversibly.

The insulator may be made slightly conductive and highly resistive by blending carbon black with a polymer such as polypropylene in a well-known manner. In such case, the shape memory conductor short circuits or bypasses the resistive insulator in its normal operating condition. When the shape memory conductor assumes its recovered shape and breaks the circuit between the collector and the lid, the highly resistive insulator is inserted in the circuit between the collector and lid and enables a small current to flow in the current path.

Thus the novel invention provides a sealed unit that is small and may be easily and economically incorporated directly into a primary electrochemical cell.

In a preferred arrangement of the present application, the self-contained thermal switch assembly has a sealed hollow switch housing that includes an electrically conductive lid and an electrically conductive collector secured together at a joint. A dielectric sealing member is interposed between the lid and collector at the joint, and a cavity is defined between the lid and collector. An elongated shape memory conductor in the cavity has opposite ends engaging contact areas on the lid and collector. The shape memory conductor has a recovered shape at elevated temperatures in which at least one of its opposite ends is out of engagement with one of the contact areas.

It also provides a simple and inexpensive means to control an electrical device by opening or closing a circuit at a predetermined temperature. The switch has few parts, and the basic design allows automatic assembly and installation.

BRIEF DESCRIPTION OF THE DRAWINGS

These and other objects, advantages and features of the present invention will be apparent on consideration of the following detailed description thereof taken in conjunction with the accompanying drawings in which like numbers represent like elements and in which.

DESCRIPTION OF A PREFERRED EMBODIMENT

Figures 1, 2, 3, 4:
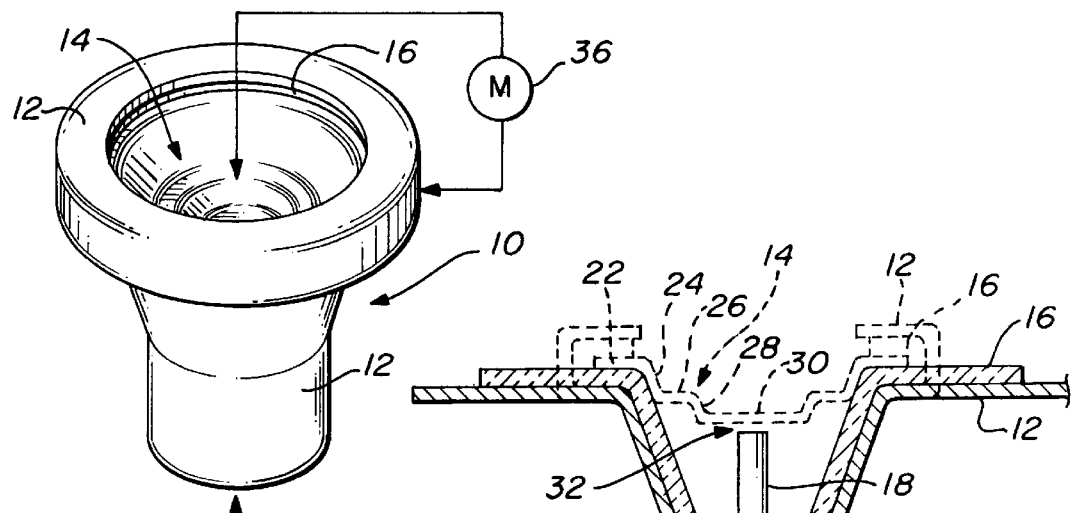
FIG. 1 is an isometric view of the thermal control switch shown as a sealed unit.
FIG. 2 is a cross sectional view of the collector portion of the switch illustrating the relationship of the insulator to the collector, the support given the shape memory conductor by the insulator, and showing in dotted lines the manner in which the outer ends of the collector and insulator are folded over the peripheral edge of the lid to form the sealed unit.
FIG. 3 is an isometric view of the lid element.
FIG. 4 is a cross sectional view of a primary electrochemical cell with the thermal cutoff switch installed therein.

FIG. 1 of the drawings is an isometric view of the preferred embodiment of the novel self-contained sealed thermal cutoff switch assembly 10. A sealed hollow housing includes a collector element 12 formed of a material such as stainless steel. Where the switch is not to be used in a corrosive atmosphere, other conductive metals could be used. The shape of the switch can be in any particular form but the preferred embodiment is in the general shape of a truncated cone as illustrated in FIG. 1. The conductive lid 14 is attached to the collector at a circumferential joint and is electrically insulated from the collector element 12 by an insulator 16. The collector 12 and lid 14 serve as the terminals of the novel thermal cutoff switch that are connected to an electrical circuit.

FIG. 2 is a cross sectional view of the novel thermal cutoff switch 10 illustrating the construction thereof. The outer collector 12 is formed into any predetermined shape desired such as the general shape of a truncated cone as shown in FIG. 2. It is to be noted that the shape of the truncated cone in FIG. 2 is the preferred embodiment and other shapes could be used as desired to form the switch to removably fit in a particular location in a desired circuit. The insulator 16 is placed on the inside contour of the collector 12. Alternatively, the insulator could be placed on the inside contour of the lid 14. An opening 20 is formed in the insulator 16 and an elongated shape memory conductor 18 in the form of a wire is inserted therein to make electrical contact with the collector 12. The shape memory conductor 18 is constructed as is well known in the art such that when it is subjected to a temperature equal to or greater than the recovery temperature of the nitinol wire from which it is constructed, the wire will change to its recovered shape. In the present application, the wire is wound around a mandrel and heat treated for two hours at 325° C. The wire is then straightened and cut to the appropriate length to fit in the thermal cutoff switch as shown in FIG. 2. The recovered shape of the shape memory conductor 18 will be a curved section of a coil of a helically wound spring as generally indicated by dotted line showing 18a in FIG. 4.

The conductive lid 14 is illustrated in FIG. 3, and, in the preferred embodiment, comprises a stainless steel disk having a first ledge 22, a shoulder 24 dropping to a second ledge 26 and a second shoulder 28 dropping to a third ledge 30. The purposes of the shoulders will be shown hereafter in conjunction with FIG. 4.

As illustrated in FIG. 2, the lid 14, indicated in dashed lines, is placed as shown with the outer ledge 22 of the lid 14 resting on the horizontal portion of the insulator 16. The collector 12 and insulator 16 may then be folded upwardly and over the outer periphery or ledge 22 of lid 14 in a U-shaped manner as shown in dashed lines to hold the lid 14 in place. If desired, the unit can be sealed by crimping the outer edges of the conductor 12 and insulator 16 in a well-known manner to form a tight seal against the outer shoulder 22 of the lid 14. It will be noted in FIG. 2 that the length of the shape memory conductor 18, which is in the shape of an elongated wire, is cut so that it is slightly less than the spaced distance between the collector electrode 12 and the lid 14 as indicated by the space 32. After the outer edges of the collector 12 and insulator 16 are folded over the lid 14 to hold it in place, pressure is applied to the base of the collector as indicated by the arrow 34 (or to the lid 14) to deform the collector 12 (or lid 14) and force the elongated shape memory conductor 18 in contact with the lid 14. By placing a meter 36 across the lid 14 and the collector 12 as shown in FIG. 1, continuity will be indicated when the shaped memory conductor 18 and lid 14 contact each other sufficiently to establish an electrical circuit between the collector 12 and the lid 14.

When contact has been established as indicated by meter 36, the sealed unit is in operating condition and is ready to be utilized in a circuit where it will respond to a predetermined temperature to open the circuit.

Thus the invention disclosed in FIGS. 1, 2 and 3 comprises a combination of parts that, assembled, represent a one shot thermal cutoff. The key component is the short length of nitinol wire 18 which has been alloyed, formed, heat treated, and reformed such that it will change shape at the predetermined temperature in a predictable manner. The outer shell or collector 12 and the lid 14 serve as the electrical contacts for the sealed unit. Separating the collector 12 and lid 14 is an insulator 16 that may be formed of a plastic liner. It will be noted that in the preferred embodiment the liner generally follows the inside contour of the collector 12. The important concept is to keep the lid 14 and collector 12 electrically isolated except for the shape memory conductor. Thus the insulating liner may be of different shapes and placed in different locations so long as only the shape memory conductor electrically contacts the conductor 12 and lid 14. The lid 14 is held in place at the open end of the collector by folding the top lip of the collector 12 and the insulator 16 over the outer edge of the lid 14 to hold and insulate the lid 14 in place.

As stated earlier, the nitinol wire 18 is a straight piece which is located between the lid 14 and the side of the collector 12 opposite the lid 14. The wire 18 is held in alignment by the opening 20 through the insulator 16 which supports the end of the wire 18 adjacent and in electrical contact with the side of the collector 12. The length of the wire 18 is selected to be no longer than the assembly distance between the lid and the inside of the collector 12 that is opposite the lid 14. Tolerances generally require the wire length 18 to be shorter than this distance.

When the assembly is completed with the collector 12, insulator 16, lid 14 and wire 18 in place, the accumulated tolerances may be removed to establish continuity by a single adjustment. The continuity meter is connected between the collector 12 and the lid 14. A flat end of a pin or other force producing device is pushed against the collector 12 (or the lid 14) so as to deform the side of the collector 12 (or the lid 14) against which the end of wire 18 is located. As the pin is pushed in the direction of arrow 34, the side of the collector 12 (or lid 14) is deformed and the wire 18 is moved toward the lid 14 (or collector 12). When wire contact between the lid 14 and collector 12 is established by a stable reading on the continuity meter, the thermal cutoff switch is complete and ready for service.

In operation, when the thermal cutoff switch 10 is subjected to a temperature equal to or greater than the recovery temperature of the nitinol wire 18, the wire 18 will change to its recovered shape. As indicated earlier, in this application, the wire 18 is wound around a mandrel and heat treated for 2 hours at 325° C. The recovered shape, therefor, will be a curved section of a coil of a helically wound spring. The wire 18 is then straightened and cut to the appropriate length as described above to fit in the thermal cutoff switch. When the wire 18 recovers its curved shape, the chord so defined essentially represents a foreshortened wire which no longer touches both lid and collector thereby breaking the circuit as generally indicated at 18a in FIG. 4.

The wire 18 can be "trained" to return to its straight shape after cooling thus reconnecting the circuit as in a thermostat. The training can be accomplished by thermal cycling the nitinol wire between its recovery temperature and a much cooler temperature, and straightening the wire while cold until the wire returns to the straight shape upon cooling from its recovery temperature. The same result can be obtained by subjecting the wire to certain thermal conditioning peculiar to the processing of nitinol wire while it is being cooled.

The nitinol thermal cutoff switch can be used for, and is ideally suited as, a protection for a primary electrochemical cell such as a lithium battery. Such a battery is illustrated in cross section in FIG. 4. In FIG. 4, the cell 36 includes a housing 38 which may be hermetically sealed and which has a terminal 40 at the top thereof with the second terminal 42 being the bottom of the case 38. The electrodes 44 of the cell 36 are located on the interior of the housing 38 and are spirally wound. One of the electrodes is made of an anode material such as lithium, in one case, while the other electrode 26 may be formed of a grid having on its outer surface a cathode material such as carbon.

Construction of such a cell is old and well known in the art. The two spiral wound electrodes are separated from each other by a porous insulating separator. The cell is filled with a quantity of electrolyte solution. Other materials for the electrodes and electrolyte solution can be used as is well known in the prior art and will not be described here. Such electrodes may be sandwiched or layered or there may be a collection of cells in series, or in parallel to form the battery. The lithium battery is discussed here for example only and not by way of limitation.

The generally funnel shape or truncated cone shape of the collector 12 is ideally suited for the jelly roll type battery where the electrodes are formed in the spiral because of the open center 46 which is formed by the spiral. The funnel shape of the collector 12 allows the thermal cutoff switch to be inserted into the center 46 of the "jelly roll" and electrically engage the anode 48 of the battery 36. This occurs because the lid 14 of the thermal cutoff switch 10 can press against the interior projection 48 of the anode terminal 40. Since the center 50 of the internal projection 48 may have an opening 52 to allow emergency venting of an electrolyte in case of battery overheating, the lid 14 is equipped with shoulders or projections 24 and 28 which separate the lid 14 and the interior projection 48 to allow the passage of venting electrolyte.

Some battery makers may choose to have a high resistance across the open thermal cutoff switch 10 to bleed down battery power if the switch 10 were to be opened by a short circuited battery. Such a battery, when discarded, is thereby rendered more benign. A high resistance across an opened thermal cutoff switch 10 can be provided by a slightly conductive insulator 16. Such a high resistive material can be made by blending carbon black with a polymer such as polypropylyene or obtaining a commercially available material as is well known in the art.

To resist the hostile environment generated by the battery electrolytes, the collector 12 and lid 14 may be made of stainless steel. Polypropylyene is unaffected by the electrolytes and the nitinol is composed of stainless steel. It follows that each of the components of the thermal cutout switch are resistant to electrolytes; however, the inside of the thermal cutout switch 10 may be sealed by securely crimping the edge of the collector 12 and the adjacent insulator 16 around the periphery of the lid 14 as described earlier.

An advantage of the battery control circuit described herein is that the nitinol connectors are made end-to-end. Nitinol has a normal oxide coating that must be stripped away if contact is to be made to any other surface. The ends, however, are clean when cut and, thus, do not require any further cleaning. Also, the columnar mounting of the wire 18 permits relatively high contact forces which result in low contact resistance, a highly desirable feature in batteries. Thus, there has been disclosed a simple and inexpensive device for controlling an electrical circuit.

In operation, as illustrated with respect to the battery in FIG. 4, as current flows from the battery electrode through the collector 12 to the shape memory conductor 18, the lid 14 and the terminal 40 of the battery, the unit 10 is not only in the electrical circuit but is also inside the case subject to the heating of the battery 36. Should the battery overheat for any reason, when a predetermined temperature is obtained, shape memory conductor 18 returns to its recovered shape in the form of an arc as generally indicated at 18a in FIG. 4, and breaks the connection with the lid 14 at the top of the switch 10. At the same time, a conductive path is established through the insulator 16 which has a high resistance. Thus, a minimal amount of current may flow if the battery is short circuited internally, thus slowly discharging the battery and rendering it harmless.

Clearly the switch 10 can be formed in a shape other than that shown in FIGS. 1–4 for use in other confined areas and situations. For instance, in a fire warning circuit, the switch 10 may be in a circuit conducting electricity in an area where a fire may occur. If such is the case, as the device is heated by a fire or other abnormal heating, the shape memory conductor 18 again will assume its recovery position opening its contact with the lid 14 and breaking the circuit thus allowing an alarm to be tripped.

Of course the nitinol shape memory conductor 18 could have a recovery position as a straight wire and an initial position as a curved wire. In such case, an alarm circuit could be tripped when a shaped memory conductor 18 assumes its recovery position as a straight wire thus making contact with lid 14 and creating a circuit.

Figure 5:
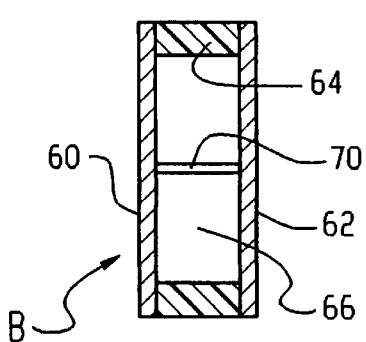
FIG. 5 is a cross-sectional elevational view of another embodiment.

FIG. 5 shows a sealed thermal switch assembly B having a pair of outer metal plates 60 and 62 bonded by adhesive or heat to a dielectric spacer ring 64. A cavity 66 between plates 62 and 64 receives a wire 70 of shape memory alloy. Wire 70 has a substantially straight configuration in its deformed shape as shown in FIG. 5. In its recovered shape at elevated temperatures, wire 70 is bent or coiled so that at least one of its ends moves out of contact with one of plates 60 or 62. Wire 70 has a length slightly larger than the distance between the inner surfaces of plates 60 and 62. Therefore, wire 70 is under compression axially of its length when it is installed between plates 60 and 62 in order to ensure good electrical contact between the ends of wire 70 and the inner surfaces of plates 60 and 62. One end portion of wire 70 may be attached to an inner surface of one plate by welding or by adhesive. However, it is possible to temporarily hold one end portion of wire 70 to the inner surface of one plate with a gel or grease while the other plate is assembled to the dielectric ring. The wire is then held in place by the compressive force of the plates acting on the ends of wire 70.

Figure 6:
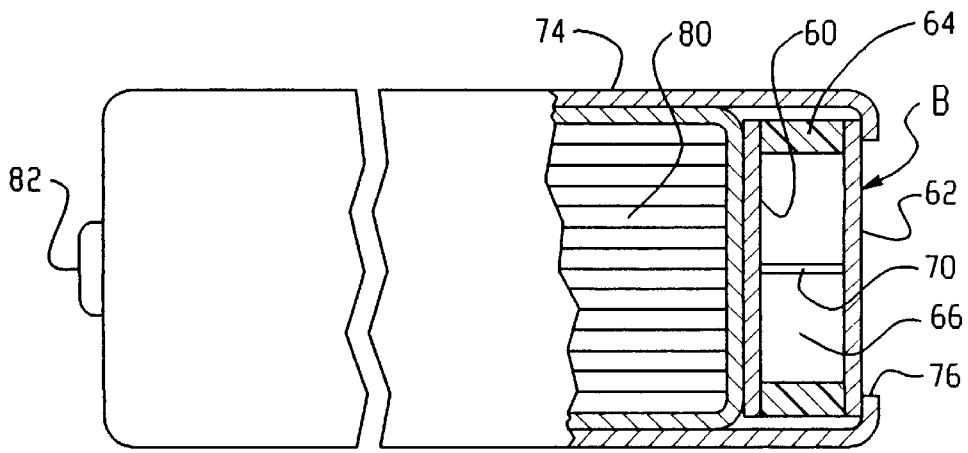
FIG. 6 is a side elevational view of a battery with portions cut-away and in section to show the embodiment of FIG. 5 within the battery.

FIG. 6 shows thermal switch assembly B received in the bottom of a battery case 74 and retained therein by an inward deformation 76 of battery case 74. Plate 60 engages a coiled electrode assembly 80 within battery case 74. An anode terminal 82 is provided at the opposite end of the battery case. In the arrangement shown, plates 60 and 62 are substantially flat circular discs and it will be appreciated that other shapes can be used.

Figure 7:
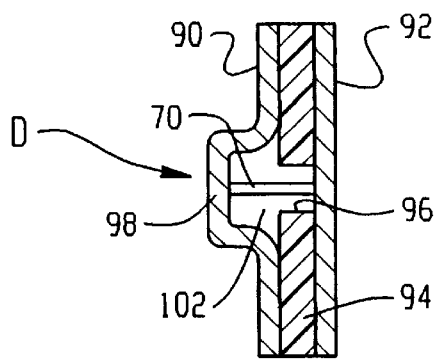
FIG. 7 is a cross-sectional elevational view of another embodiment.

FIG. 7 shows a pair of outer metal members 90 and 92 bonded by the use of adhesive or heat to a dielectric spacer 94 having a central hole 96 therethrough. Outer member 90 is formed with a central projection 98 that forms the anode of a battery. Wire 70 is held under compression between outer members 90 and 92 within cavity 102 in the same manner as described with respect to the embodiment of FIG. 5.

Figure 8:
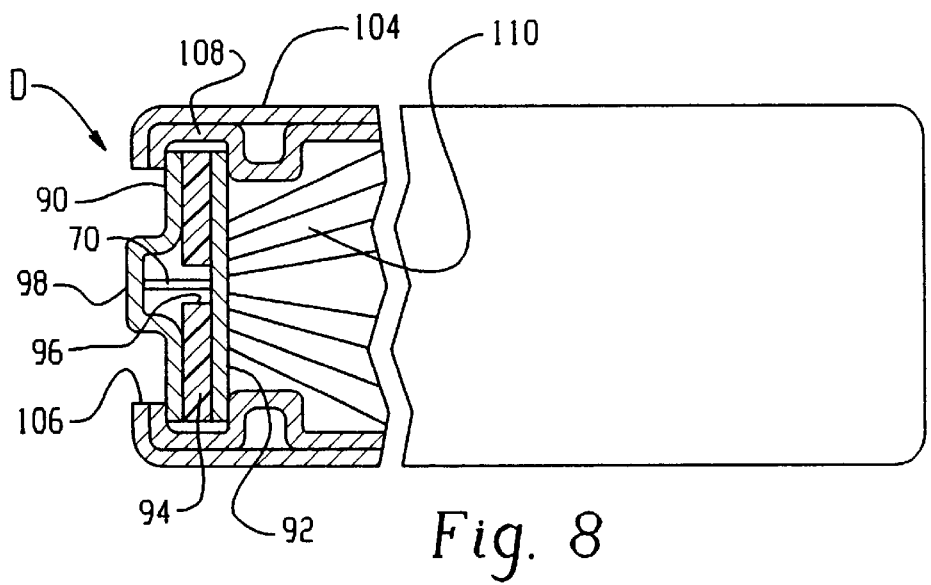
FIG. 8 is a side elevational view of a battery with portions cut-away and in section to show the embodiment of FIG. 7 within the battery.

Switch assembly D of FIG. 7 is positioned within a battery case 104 as shown in FIG. 8 and the battery case is crimped inwardly as indicated at 106. A dielectric sealing member 108 is positioned between switch assembly D and battery case 104. A coiled electrode assembly 110 within battery case 104 engages outer member 92 of switch assembly D as shown in FIG. 8.

In an arrangement where the shape memory wire is not attached by welding or the like to one metal outer member, it will become completely loose within the cavity upon assuming its recovered shape at an elevated temperature, and will not reestablish a current path when the temperature returns to normal.

The length and diameter of the cylindrical shape memory wire are such that it may be placed in axial compression between the pair of metal outer members without any significant lateral bending.

The invention has been described in connection with a preferred embodiment. This description is not intended to limit the scope of the invention to the particular form set forth, but, on the contrary, it is intended to cover such alternatives, modifications and equivalents as may be included within the spirit and scope of the invention as defined in the appended claims.

I claim:

1. A self-contained thermal cutoff switch comprising a sealed hollow switch housing, said switch housing including an electrically conductive lid and an electrically conductive collector secured together at a joint and defining a cavity therebetween, a sealing member interposed between said lid and collector at said joint, an elongated shape memory conductor in said cavity and having opposite ends engaging contact areas on said lid and collector, said shape memory conductor having a recovered shape at and above a recovery temperature in which at least one of said opposite ends is out of engagement with one of said contact areas.

2. The switch of claim 1 including an electrical insulator in said cavity at least partly engaging said collector, said shape memory conductor being supported in said cavity by said insulator.

3. A thermal cutoff switch as in claim 1 wherein said housing is shaped for insertion between and making electrical contact with two electrical terminals.

4. A thermal cutoff switch as in claim 1 wherein said sealing member is slightly conductive and highly resistive.

5. A thermal cutoff switch as in claim 1 wherein the shape memory conductor is cut from a straight wire that has a recovered shape in the form of a curved coil section of a helically wound nitinol wire that has been wound around a mandrel and heat treated for about 2 hours at about 325° C.

6. The switch of claim 1 and further including an electrochemical cell having a cell housing, said cell including first and second insulated terminals forming a portion of said cell housing for providing electrical power, an electrochemical system within said cell housing that includes an anode electrode and an insulated cathode electrode, an electrolyte in contact with said electrodes, said switch housing being positioned within said cell housing and connected in series between one of said electrodes and its corresponding cell terminal.

7. A thermal switch comprising a pair of spaced-apart metal outer members having a cavity therebetween, said outer members being sealed together on opposite sides of a dielectric insulator, a substantially straight length of wire having opposite ends engaging said outer members, said wire being under compression axially of its length between said outer members, said wire being of shape memory alloy and having a first shape at low temperatures and a recovered shape at elevated temperatures, said wire being in said first shape with said opposite ends thereof engaging said outer members, and said wire having at least one of said opposite ends thereof out of engagement with at least one of said outer members in said recovered shape.

8. A method of forming a thermal cutoff switch comprising the steps of:

forming a conductive collector of a deformable metal;

forming a conductive lid;

supporting a conductive lid in a spaced relationship with the conductive collector;

forming a shape memory conductor having a first shape as an elongated wire and a second recovered shape as a curved wire when heated to a predetermined temperature;

forming said wire with a said first shape having a first shape length that is only slightly shorter than the space between the collector and the lid;

placing an insulator on at least a portion of the side of the conductive collector facing the lid;

supporting the shape memory conductor such that the shape memory conductor is held between and perpendicular to the collector and the lid;

attaching a continuity meter between the conductor and the lid; and forcing the shape memory conductor into contact with the lid and the collector to obtain continuity as detected by the meter.

9. A method as in claim 8 further comprising the step of forming the insulator as a high resistance between the collector and the lid such that when the shape memory collector is in its first shape, the high resistance is by-passed and when the shape memory conductor is in its second, recovered shape, the resistance is inserted between the collector and the lid.

10. A method as in claim 8 further including the step of forming the collector substantially in the shape of a truncated cone.

11. A method as in claim 8 further including the step of training the shape memory to assume its first elongated wire shape after cooling to a predetermined temperature to reconnect the circuit between the connector and the lid.

12. A self-contained thermal cutoff switch comprising a sealed hollow switch housing, said switch housing including an electrically conductive lid and an electrically conductive collector secured together at a joint and defining a cavity therebetween, a sealing member interposed between said lid and collector at said joint, an elongated shape memory conductor in said cavity and having opposite ends engaging contact areas on said lid and collector, said shape memory conductor having a recovered shape at and above a recovery temperature in which at least one of said opposite ends is out of engagement with one of said contact areas, an electrical insulator in said cavity at least partly engaging said collector, said shape memory conductor being supported in said cavity by said insulator, an opening in the said electrical insulator in a direction perpendicular to the collector, the opening being slightly smaller than the outer transverse dimensions of the elongated shape memory conductor and receiving and supporting the shape memory conductor perpendicular to and in electrical contact with the collector and the lid; and a U-shaped recess formed by folding over the outer end of the collector and insulator to receive and support an edge of the lid in its spaced relationship with the collector.

13. A self-contained thermal cutoff switch comprising a sealed hollow switch housing, said switch housing including an electrically conductive lid and an electrically conductive collector secured together at a joint and defining a cavity therebetween, a sealing member interposed between said lid and collector at said joint, an elongated shape memory conductor in said cavity and having opposite ends engaging contact areas on said lid and collector, said shape memory conductor having a recovered shape at and above a recovery temperature in which at least one of said opposite ends is out of engagement with one of said contact areas, means for supporting the shape memory conductor in said cavity, said means for supporting comprising an insulator element that lies against at least a part of the inside contour of the lid element.

14. A thermal cutoff switch as in claim 13 wherein the collector is formed with the general shape of a truncated cone.

15. A thermal cutoff switch as in claim 14 wherein the lid element is in the general shape of a circular plate spaced apart from the bottom of the truncated cone.

16. A thermal cutoff switch as in claim 15 wherein the conductor is in the shape of a substantially straight wire and said recovered shape is other than straight.

17. A self-contained thermal cutoff switch comprising a sealed hollow switch housing, said switch housing including an electrically conductive lid and an electrically conductive collector secured together at a joint and defining a cavity therebetween, a sealing member interposed between said lid and collector at said joint, an elongated shape memory conductor in said cavity and having opposite ends engaging contact areas on said lid and collector, said shape memory conductor having a recovered shape at and above a recovery temperature in which at least one of said opposite ends is out of engagement with one of said contact areas, said sealing member being slightly conductive and highly resistive, said sealing member being made slightly conductive by adding carbon black blended with a polymer to cause a predetermined resistance.

18. A thermal cutoff switch as in claim 17 wherein the polymer is polypropylene.

19. A self-contained thermal cutoff switch comprising a sealed hollow switch housing, said switch housing including an electrically conductive lid and an electrically conductive collector secured together at a joint and defining a cavity therebetween, a sealing member interposed between said lid and collector at said joint, an elongated shape memory conductor in said cavity and having opposite ends engaging contact areas on said lid and collector, said shape memory conductor having a recovered shape at and above a recovery temperature in which at least one of said opposite ends is out of engagement with one of said contact areas, and said collector and lid being formed from stainless steel.

20. A self-contained thermal cutoff switch comprising a sealed hollow switch housing, said switch housing including an electrically conductive lid and an electrically conductive collector secured together at a joint and defining a cavity therebetween, a sealing member interposed between said lid and collector at said joint, an elongated shape memory conductor in said cavity and having opposite ends engaging contact areas on said lid and collector, said shape memory conductor having a recovered shape at and above a recovery temperature in which at least one of said opposite ends is out of engagement with one of said contact areas, said collector having a peripheral flange and said lid having a peripheral portion, said peripheral flange being folded over said peripheral portion into a generally U-shaped configuration with said sealing member interposed between said lid and collector on both opposite sides of said peripheral portion.

21. A method of forming a thermal cutoff switch comprising the steps of forming a conductive collector of a deformable metal; forming a conductive lid; supporting the conductive lid in a spaced relationship with the conductive collector; forming a shape memory conductor having a first shape as an elongated wire and a second recovered shape as a curved wire when heated to a predetermined temperature; forming said wire with a said first shape having a first shape length that is only slightly shorter than the space between the collector and lid; placing an insulator on at least a portion of the side of the conductive collector facing the lid; supporting the shape memory conductor such that the shape memory conductor is held between and perpendicular to the collector and the lid; attaching a continuity meter between the conductor and the lid; forcing the shape memory conductor into contact with the lid and the collector to obtain continuity as detected by the meter; and said steps of forming a conductor and lid being carried out by forming them from stainless steel.

22. A method of forming a thermal cutoff switch comprising the steps of: forming a conductive collector of a deformable metal; forming a conductive lid; supporting the conductive lid in a spaced relationship with the conductive collector; forming a shape memory conductor having a first shape as an elongated wire and a second recovered shape as a curved wire when heated to a predetermined temperature; forming said wire with a said first shape having a first shape length that is only slightly shorter than the space between the collector and the lid; placing an insulator on at least a portion of the side of the conductive collector facing the lid; supporting the shape memory conductor such that the shape memory conductor is held between and perpendicular to the collector and the lid; attaching a continuity meter between the conductor and the lid; forcing the shape memory conductor into contact with the lid and the collector to obtain continuity as detected by the meter; and said step of supporting the conductive lid further comprises the step of folding the edge of the collector and the associated insulator over the edge of the lid in a U-shaped fold to rigidly support the lid in its spaced relationship with the collector.

23. A method of forming a thermal cutoff switch comprising the steps of: forming a conductive collector of a deformable metal; forming a conductive lid; supporting a conductive lid in a spaced relationship with the conductive collector; forming a shape memory conductor having a first shape as an elongated wire and a second recovered shape as a curved wire when heated to a predetermined temperature; forming said wire with a said first shape having a first shape length that is only slightly shorter than the space between the collector and the lid; placing an insulator on at least a portion of the side of the conductive collector facing the lid; supporting the shape memory conductor such that the shape memory conductor is held between and perpendicular to the collector and the lid; attaching a continuity meter between the conductor and the lid; forcing the shape memory conductor into contact with the lid and the collector to obtain continuity as detected by the meter; forming the collector with the insulator thereon as a container having an open top; forming the lid of a size to close the open top; and folding the outer edge of the container in the form of a U-shaped recess over the periphery of the lid to support the lid in its spaced insulated relationship with the collector.

24. A method as in claim 23 further comprising the step of sealing the inside of the container by crimping the outer edge of the collector with the insulator thereon around the peripheral edge of the lid.

25. A method of forming a thermal cutoff switch comprising the steps of: forming a conductive collector of a deformable metal; forming a conductive lid; supporting the conductive lid in a spaced relationship with the conductive collector; forming a shape memory conductor having a first shape as an elongated wire and a second recovered shape as a curved wire when heated to a predetermined temperature; forming said wire with a said first shape having a first shape length that is only slightly shorter than the space between the collector and the lid; placing an insulator on at least a portion of the side of the conductive collector facing the lid; supporting the shape memory conductor such that the shape memory conductor is held between and perpendicular to the collector and the lid; attaching a continuity meter between the conductor and the lid; forcing the shape memory conductor into contact with the lid and the collector to obtain continuity as detected by the meter; the step of supporting the shape memory conductor including the steps of forming an opening through the insulator in a direction perpendicular to the collector, the opening being slightly smaller than the outer transverse dimensions of the elongated shape memory conductor; and inserting one end of the shape memory conductor in the opening perpendicular to the collector until electrical contact is made between the conductor and the collector.

26. A method of forming a thermal cutoff switch comprising the steps of: forming a conductive collector of a deformable metal; forming a conductive lid; supporting the conductive lid in a spaced relationship with the conductive collector; forming a shape memory conductor having a first shape as an elongated wire and a second recovered shape as a curved wire when heated to a predetermined temperature; forming said wire with a said first shape having a first shape length that is only slightly shorter than the space between the collector and the lid; placing an insulator on at least a portion of the side of the conductive collector facing the lid; supporting the shape memory conductor such that the shape memory conductor is held between and perpendicular to the collector and the lid; attaching a continuity meter between the conductor and the lid; forcing the shape memory conductor into contact with the lid and the collector to obtain continuity as detected by the meter; and forming projections on the lid so as to create a space between a portion of the lid and any terminal placed in contact with the lid.

* * * * *